(12) United States Patent
Al-Kuait et al.

(10) Patent No.: US 11,045,762 B2
(45) Date of Patent: *Jun. 29, 2021

(54) SYSTEMS AND METHODS FOR ACCURATE MEASUREMENT OF GAS FROM WET GAS WELLS

(71) Applicant: Saudi Arabian Oil Company, Dhahran (SA)

(72) Inventors: Abdulmohsen S. Al-Kuait, Dhahran (SA); Muhammad Arsalan, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 50 days.

This patent is subject to a terminal disclaimer.

(21) Appl. No.: 16/502,903

(22) Filed: Jul. 3, 2019

(65) Prior Publication Data

US 2019/0321775 A1    Oct. 24, 2019

Related U.S. Application Data

(63) Continuation of application No. 15/259,275, filed on Sep. 8, 2016, now Pat. No. 10,384,161.

(Continued)

(51) Int. Cl.
*B01D 46/46* (2006.01)
*B01D 53/30* (2006.01)
(Continued)

(52) U.S. Cl.
CPC ............. *B01D 53/30* (2013.01); *B01D 45/08* (2013.01); *B01D 53/26* (2013.01); *E21B 43/34* (2013.01); *G01F 1/74* (2013.01); *G01F 15/08* (2013.01); *B01D 17/0214* (2013.01); *B01D 17/0217* (2013.01); *G01F 1/44* (2013.01);
(Continued)

(58) Field of Classification Search
CPC ........ B01D 53/30; B01D 45/08; B01D 53/26; B01D 17/0217; B01D 17/0214; G01F 1/74; G01F 15/08; G01F 3/38; G01F 3/30; G01F 7/00; G01F 15/005; G01F 1/44; E21B 43/34

See application file for complete search history.

(56) References Cited

U.S. PATENT DOCUMENTS 2,158,381 A    5/1939   Raymond
2,831,350 A    4/1958   Banks
(Continued)

FOREIGN PATENT DOCUMENTS

GB        2142725 A   *  1/1985  ........... G01F 1/3281

OTHER PUBLICATIONS

Atkinson, D.I., et al.; "High-Accuracy Wet-Gas Multiphase Well Testing and Production Metering" SPE Annual Technical Conference and Exhibition, Houston, TX; Sep. 26-29, 2004; SPE 90992; pp. 199-205.

(Continued)

*Primary Examiner* — Dung H Bui
(74) *Attorney, Agent, or Firm* — Bracewell LLP; Constance G. Rhebergen; Kevin R. Tamm

(57) ABSTRACT

Systems and methods for liquid removal to increase the accuracy of gas flow meters, such as venturi meters. Systems and methods include a liquid knockout drum, an impingement plate, a drum separator, and a check valve.

10 Claims, 2 Drawing Sheets

Related U.S. Application Data

(60) Provisional application No. 62/215,191, filed on Sep. 8, 2015.

(51) Int. Cl.

| | | |
|---|---|---|
| *E21B 43/34* | (2006.01) | |
| *B01D 45/08* | (2006.01) | |
| *B01D 53/26* | (2006.01) | |
| *G01F 1/74* | (2006.01) | |
| *G01F 15/08* | (2006.01) | |
| *G01F 1/44* | (2006.01) | |
| *G01F 3/38* | (2006.01) | |
| *B01D 17/02* | (2006.01) | |
| *G01F 3/30* | (2006.01) | |
| *G01F 7/00* | (2006.01) | |
| *G01F 15/00* | (2006.01) | |

(52) U.S. Cl.
CPC ............... *G01F 3/30* (2013.01); *G01F 3/38* (2013.01); *G01F 7/00* (2013.01); *G01F 15/005* (2013.01)

(56) References Cited

U.S. PATENT DOCUMENTS

| | | | |
|---|---|---|---|
| 3,001,398 A | 9/1961 | Shepherd | |
| 3,021,709 A | 2/1962 | Walker et al. | |
| 4,395,385 A | 7/1983 | Welsh | |
| 4,671,071 A | 6/1987 | Sasaki | |
| 5,036,710 A | 8/1991 | King | |
| 6,032,539 A | 3/2000 | Liu et al. | |
| 6,984,260 B2 | 1/2006 | Atkinson et al. | |
| 7,749,308 B2 | 7/2010 | McCully | |
| 9,134,160 B2 | 9/2015 | Ahmad et al. | |
| 2006/0249365 A1* | 11/2006 | Yada | B01D 3/322 202/152 |
| 2007/0006727 A1* | 1/2007 | Gysling | G01F 1/7082 95/1 |
| 2008/0000306 A1* | 1/2008 | Agar | G01F 25/0007 73/861.04 |
| 2008/0236298 A1* | 10/2008 | Gysling | G01F 1/712 73/861.42 |
| 2008/0245722 A1* | 10/2008 | Koike | B01D 29/114 210/266 |
| 2011/0072975 A1 | 3/2011 | Aarebrot et al. | |
| 2011/0308311 A1* | 12/2011 | Dalia Betta | G01F 1/6842 73/170.12 |
| 2012/0046870 A1* | 2/2012 | Lievois | G01F 1/74 702/12 |
| 2013/0247684 A1* | 9/2013 | Suda | E21B 43/34 73/861.04 |
| 2015/0185062 A1 | 7/2015 | Ahmad et al. | |
| 2015/0247749 A1 | 9/2015 | Chen | |
| 2016/0007882 A1* | 1/2016 | Bates | A61B 5/091 600/538 |
| 2016/0370213 A1* | 12/2016 | Stromsten | A61M 16/206 |

OTHER PUBLICATIONS

International Search Report and Written Opinion for related PCT application PCT/US2016/050638 dated Dec. 13, 2016.

De Leeuw, H., et al.; "Operational Experience of Wet Gas Metering in Malaysia" SPE Asia Pacific Oil and Gas Conference and Exhibition, Perth, Australia; Oct. 18-20, 2004; SPE 88593; pp. 1-9.

Mehdizadeh, Parviz et al.; "Wet Gas Metering: Trends in Applications and Technical Developments" SPE Annual Technical Conference and Exhibition, San Antonio, TX; Sep. 29-Oct. 2, 2002; SPE 77351; pp. 1-14.

Stewart, David G., et al.; "Wet Gas Venturi Metering" SPE Annual Technical Conference and Exhibition, San Antonio, TX; Sep. 29-Oct. 2, 2002; SPE 77350; pp. 1-11.

* cited by examiner

SYSTEMS AND METHODS FOR ACCURATE MEASUREMENT OF GAS FROM WET GAS WELLS

PRIORITY

This application is a non-provisional continuation application of U.S. patent application Ser. No. 15/259,275, filed Sep. 8, 2016, and published as U.S. Pat. Pub. No. 2017-0065932, which itself is a non-provisional application of and claims priority to and the benefit of U.S. Prov. App. Ser. No. 62/215,191, filed Sep. 8, 2015, the entire disclosures of which are expressly incorporated here by reference.

BACKGROUND

Field

Embodiments of the disclosure relate to systems and methods for accurate measurement of gas recovered from a gas well. Specifically, embodiments relate to accurate measurement of wet gas recovered from a gas well using a venturi meter.

Description of the Related Art

Venturi meters are widely used to measure the flow rates of gases, including single-phase gas flow rates of natural gas recovered from gas reservoirs. These meters provide accurate gas flow measurements at the early stages during the life of a gas well, when the well is producing dry gas with a small amount of liquid, such as less than about 5% by volume. However, as reservoirs become mature, the wells start to "cut" or produce more liquid, such as water or other condensate, with the gas. This can occur as the reservoir temperature and pressure decline with production. Liquid present with the gas affects the accuracy of gas flow rate measurement by venturi meters. Additional liquid in the recovered natural gas leads to inaccurate production monitoring, allocation, and reservoir engineering and management decisions.

Nearly all existing gas-producing wells are equipped with venturi meters to measure gas flow rates. However, using multiple venturi meters to correct for the inaccuracies caused by increased liquid cut is expensive and requires significant infrastructure modifications to existing and new pipeline systems. Existing methods to correct for increased liquid cut are expensive and require a number of modifications and additions to existing systems and require frequent calibrations.

SUMMARY

Applicant has recognized that there is a need for accurate and efficient measurement of natural gas flow rates from wet gas wells. The proposed systems and methods are efficient and do not require any modifications to existing venturi meters other than adding a liquid knockout drum ahead of the venturi meter. One advantage of this technology is utilizing the existing infrastructure without doing any major ground work by installing a knockout surge tank ahead of the existing venturi meter to knock out the liquid that is being produced with the gas. In certain embodiments of the disclosure, no additional liquid storage tanks or new, separate flow lines are required.

The disclosure presents the methodology for correcting the erroneous readings of venturi meters for measuring gas flow rates when liquid is being produced from gas wells along with natural gas. The proposed systems and methods take advantage of existing infrastructure in proximity to the venturi meters and are designed to be retrofitted to knock out the liquid before the venturi meter. Any knocked out liquid fluid, such as water or other condensate, is then recombined into the gas flow after the venturi meter without the need for a compressor or additional flow line to carry away the liquid.

A simple, retrofitable modification is proposed to improve the accuracy of the wet gas flow measurements using existing venturi meters. The technique is quick to apply due to the ready set up and lay-out of existing gas wells, which serves the purpose of applying the recommended technology to have accurate gas rate measurements. The proposed systems and methods are straightforward to implement and require minimal maintenance. The systems and methods are very practical as well, since the venturi meter is located ahead of a choke valve, which allows for knock out of liquid fluids and potential condensates due to the differential pressure across the choke.

Liquid fluid, such as water, or other potential condensates can form in the gas stream. Liquid that is being knocked out in a knockout drum, or surge tank, can be pumped back to the flow-line downstream of the choke by pressurizing the liquid in the tank using higher gas pressure upstream of the choke. In some embodiments, the knockout drum has a check valve to allow liquids to flow out of the tank, and thus bypass the venturi meter. The check valve will not allow liquid to be carried through the venturi meter by flowing natural gas. This results in having only dry gas passing through the venturi meter, and this will result in more accurate gas flow rate measurements. The systems and methods also avoid having external means such as compressors to pump out the liquid that is being accumulated in the knockout drum.

Systems and methods of the present disclosure lead to accurate gas measurements for wet gas wells and more accurate and reliable gas rate allocations, which aid in both production and reservoir management, and also in planning studies.

Embodiments of the disclosure include a liquid removal system for increasing accuracy of gas flow meters. The system includes a liquid knockout drum, the liquid knockout drum operable to receive a natural gas feedstream comprising wet gas, the liquid knockout drum further comprising: an impingement plate, where the impingement plate is disposed proximate to the natural gas feedstream, and is operable to remove liquids from the natural gas feedstream; a drum separator, where the drum separator separates a first portion of the liquid knockout drum from a second portion of the liquid knockout drum, the drum separator operable to collect the liquids removed from the natural gas feedstream by the impingement plate; and a check valve, where the check valve is disposed between the first portion of the liquid knockout drum and the second portion of the liquid knockout drum proximate the drum separator, and the check valve is operable to allow one way liquid fluid communication from the first portion of the liquid knockout drum to the second portion of the liquid knockout drum when the check valve is an in open state.

The system further includes a dry gas outlet line in fluid communication between the first portion of the liquid knockout drum and a gas flow meter, where the dry gas outlet line is operable to allow dry gas flow from the liquid knockout drum to the gas flow meter; a pressurized line comprising dry gas in fluid communication with the second portion of the liquid knockout drum, the pressurized line operable to drive liquids in the second portion of the liquid knockout drum through a liquid outlet line; and a manifold line, where the manifold line is operable to recombine dry gas from the dry gas outlet line and liquids from the liquid outlet line.

In some embodiments, the system further comprises a choke valve disposed between the gas flow meter and the manifold line. In other embodiments, the system further comprises a valve between the pressurized line comprising dry gas and the second portion of the liquid knockout drum. Still in other embodiments, the system comprises a valve between the second portion of the liquid knockout drum and the manifold line. In yet other embodiments, the gas flow meter is a venturi meter.

Still in other embodiments, the impingement plate is disposed between about 0.1 m and about 1 m away from the natural gas feedstream comprising wet gas, and the impingement plate comprises a forward face disposed facing toward the natural gas feedstream, where the forward face is larger than an inlet cavity of the natural gas feedstream comprising wet gas. In some embodiments, the check valve is operable to remain closed as the liquids collect around the drum separator, and is operable to open responsive to a level of the liquids collecting proximate the drum separator reaching a predetermined level. In other embodiments, a diameter of the gas flow meter is less than a diameter of the dry gas outlet line.

In certain embodiments, diameters of the pressurized line comprising dry gas and the liquid outlet line are less than diameters of the dry gas outlet line and manifold line. In some embodiments, the valve between the pressurized line comprising dry gas and the second portion of the liquid knockout drum and the valve between the second portion of the liquid knockout drum and the manifold line are operable to open responsive to the check valve opening.

Additionally disclosed is a method for liquid removal to increase accuracy of gas flow meters, where the method comprises the steps of contacting a natural gas feedstream comprising wet gas with an impingement plate and separating liquids from the natural gas feedstream to produce a dry gas stream and aggregated liquids. The method further includes the steps of collecting the aggregated liquids from the natural gas feedstream; measuring a flow rate of the dry gas stream; pressurizing the collected aggregated liquids with a portion of the dry gas stream after measuring the dry gas stream; and flowing the collected aggregated liquids and the portion of the dry gas stream to a common line.

Some embodiments of the method further comprise the step of recombining the aggregated liquids and the portion of the dry gas stream with a remaining portion of the dry gas stream, where the remaining portion of the dry gas stream is not used to pressurize the aggregated liquids. In other embodiments of the method, the step of separating liquids from the natural gas feedstream further comprises the step of utilizing a liquid knockout drum, the liquid knockout drum operable to receive the natural gas feedstream comprising wet gas.

Still in other embodiments, the step of collecting the aggregated liquids from the natural gas stream further comprises the step of accumulating the aggregated liquids at a drum separator, where the drum separator separates a first portion of the liquid knockout drum from a second portion of the liquid knockout drum. In yet other embodiments, the step of collecting the aggregated liquids from the natural gas feedstream further comprises the step of actuating a check valve, where the check valve is disposed between the first portion of the liquid knockout drum and the second portion of the liquid knockout drum proximate the drum separator, and where the check valve is operable to allow one way liquid fluid communication from the first portion of the liquid knockout drum to the second portion of the liquid knockout drum when the check valve is an in open state.

In some embodiments of the method, the step of pressurizing the aggregated liquids further comprises the step of opening a valve disposed between a gas flow meter and the second portion of the liquid knockout drum. Still in other embodiments, the step of recombining the aggregated liquids and the portion of the dry gas stream with the remaining portion of the dry gas feed stream further comprises the step of opening a valve between the second portion of the liquid knockout drum and the common line.

In certain embodiments, the step of measuring the flow rate of the dry gas stream further comprises the step of utilizing a venturi meter. Still in other embodiments, the method includes the step of disposing the impingement plate between about 0.1 m and 1 m away from the natural gas feedstream comprising wet gas, with a forward face disposed facing toward the a natural gas feedstream, where the forward face is larger than an inlet cavity of the natural gas feedstream comprising wet gas.

In some embodiments, the step of actuating a check valve check further comprises maintaining the check valve in a closed position as aggregated liquids collect around the drum separator, and opening the check valve responsive to a predetermined level of aggregated liquids collecting proximate the drum separator. In other embodiments, the step of measuring the flow rate of the dry gas stream further comprises flowing the dry gas stream through a portion of pipe with a reduced diameter.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
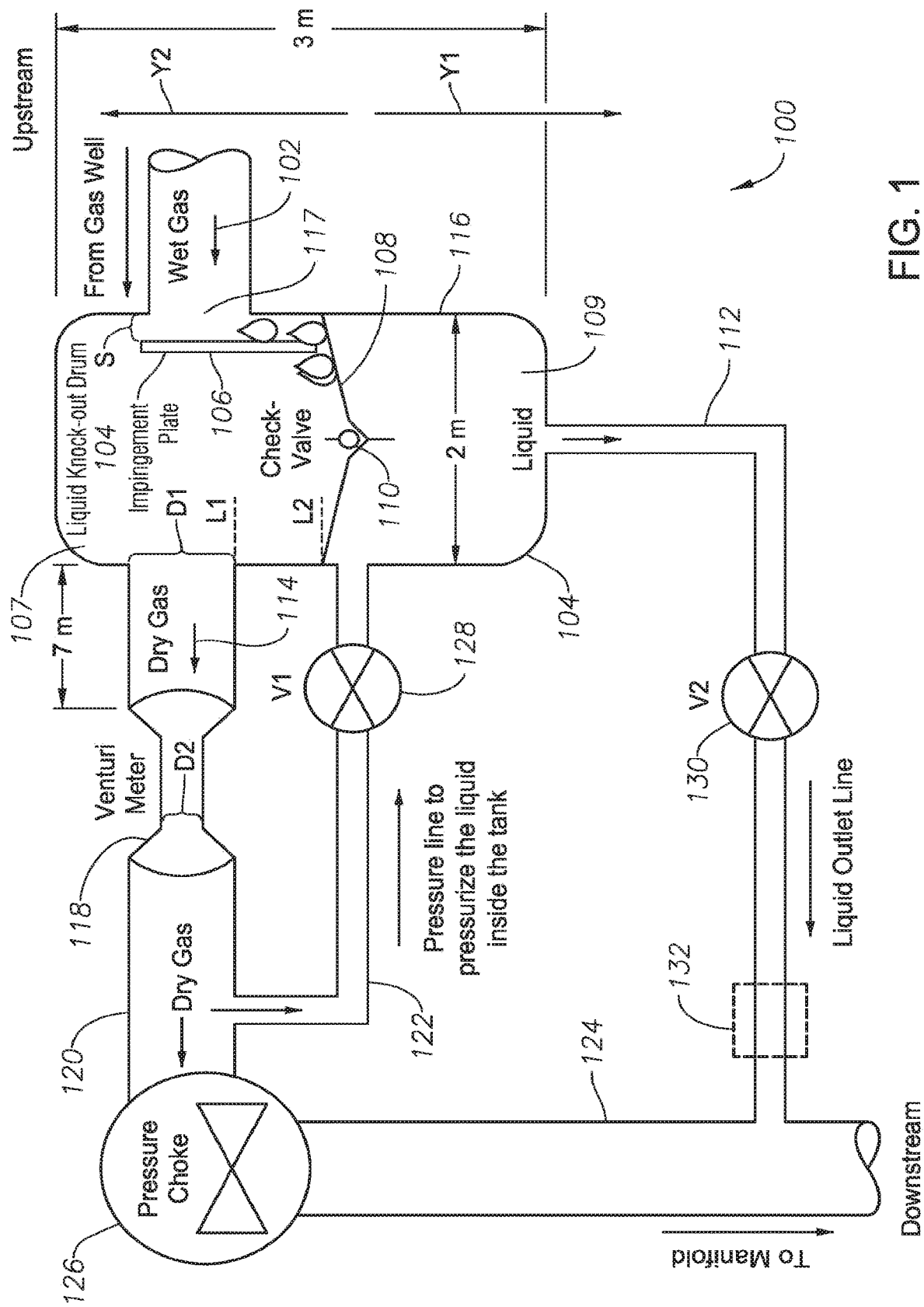
FIG. 1 is schematic diagram of one embodiment of a liquid knockout system for a wet gas well.

So that the manner in which the features and advantages of the embodiments of systems and methods for accurate measurement of gas from wet gas wells, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

To make use of existing venturi meters for accurate gas flow measurements in the presence of liquid, such as water or other fluids, without doing any extensive infrastructure modifications, systems and methods are proposed to accurately measure only gas phase flow, without having liquid fluid impact the accuracy of the venturi meters. Embodiments comprise a knockout surge tank, also referred to as a liquid knockout drum, that will be installed upstream of the venturi meter allowing only gas with minimal liquid contents to pass through the meter.

The trapped liquid in the liquid knockout drum will be reintroduced back into the gas flow line downstream of the venturi meter by pressure and a choke valve, by pressurizing the liquid knock out drum using the line pressure between the venturi meter and the choke valve. The proposed liquid knockout drum will be equipped with a splashing mechanism, also referred to as an impingement plate, to have dry gas moving upward passing through the venturi meter and liquid, such as water and other fluids, being dropped to the bottom of the tank. The liquid knockout drum is also equipped with a check valve to allow liquid to flow to the bottom of the tank, while preventing the liquid from flowing back to the gas stream upstream of the venturi meter.

Liquid that is knocked out of the wet gas stream in the tank can be pumped back to the dry gas flow line downstream of the choke by pressurizing the liquid in the liquid knockout tank using line pressure upstream of the choke. Only substantially dry gas that is substantially free of liquid fluid passes through the venturi meter, and this leads to accurate gas rate measurements. This also will avoid having some external means, such as compressors, to pump out the liquid that is being accumulated in the liquid knockout drum. As the liquid will be reintroduced in the same gas flow line downstream of the choke valve and venturi meter, no additional line or storing and handling infrastructure of the knocked-out liquid will be needed.

Substantially dry gas or dry gas, as referred to in this specification, refers to gas in which the flow can be accurately measured by a single-phase gas flow meter, such as a venturi meter. Single-phase gas flow meters, such as venturi meters, can be calibrated to measure the gas flow within accuracy requirements if the amount of liquid fluid in the gas stream is less than about 6% by volume. If the liquid fluid in the gas stream is greater than about 6% by volume, the error in the gas flow rate obtained from single-phase gas flow meters falls into an unacceptable accuracy range. Substantially wet gas or wet gas, as referred to in this specification, refers to gas in which the flow cannot be accurately measured by a single-phase gas flow meter, such as a venturi meter.

Referring now to FIG. 1, a schematic diagram is shown of one embodiment of a liquid knockout system for a wet gas well. Liquid knockout system 100 includes a feedstream 102 from a gas well producing wet gas. A feedstream comprising wet gas can include wet gas from a newly-drilled gas well, a mature gas well, or can include wet gas produced from a combination of gas wells, such as newly-drilled and mature gas wells. Liquid knockout system 100 further includes a liquid knockout drum 104, which itself includes an impingement plate 106, a drum separator 108, a check valve 110, a liquid outlet line 112, and a dry gas outlet line 114.

Liquid knockout drum 104 is shown to be a substantially cylindrical drum that is substantially rectangular in the cross section; however, in other embodiments the liquid knockout drum could be any other shape suitable to allow liquids and other fluids to collect below a dry gas outlet line. For example, a substantially spherical liquid knockout drum or surge tank that is substantially circular in the cross section could be used if it allowed for liquids and other fluids to collect below a dry gas outlet line. A liquid knockout drum or surge tank can be made of any suitable material or any suitable combination of materials known in the art such as steel, stainless steel, metal alloys, plastics, and composite materials.

In the embodiment of FIG. 1, the pressure in the liquid knockout drum 104 is about 66 atmospheres (atm) (about 950 pounds per square inch gauge (psig)) and the temperature is about 82° C. (about 180° F.). The liquid knockout drum 104 has a diameter of about 2 meters (m) and a height of about 3 m, and is located about 7 m upstream of the venturi meter 118. In other embodiments, differently sized and shaped liquid knockout drums could be used to optimize liquid knockout responsive to system characteristics. In some embodiments, a liquid knockout drum is located between about 1 m and about 20 m upstream of a venturi meter. In other embodiments, a liquid knockout drum is located between about 5 m and about 10 m upstream of a venturi meter. In some embodiments, a liquid knockout drum is disposed between about 0.3 m (about 1 foot) and about 3 m (about 10 feet (ft)) above the ground. In other embodiments, a liquid knockout drum is disposed between about 0.60 m (about 2 ft) and about 1.22 m (about 4 ft) above the ground.

As shown, feedstream 102 enters liquid knockout drum 104 substantially perpendicularly to a side wall 116 of the liquid knockout drum 104, and substantially in line with dry gas outlet line 114. In other embodiments, a feedstream can enter a liquid knockout drum disposed at any suitable disposition or angle relative to the liquid knockout drum, and the feedstream need not enter the liquid knockout drum substantially in line with the dry gas outlet line or liquid outlet line. In some embodiments, the pressure and temperature within a liquid knockout drum are substantially equivalent to the pressure and temperature within a feedstream and a dry gas outlet line.

Impingement plate 106 is disposed within liquid knockout drum 104 and is disposed substantially perpendicular to, proximate to, and in front of inlet cavity 117 of feedstream 102. Feedstream 102, including wet gas in feedstream 102, contacts impingement plate 106 within liquid knockout drum 104. When the wet gas contacts impingement plate 106, liquid fluids such as water, and potentially gas condensates, aggregate on impingement plate 106, and the liquid fluids on impingement plate 106 run downwardly by gravity in the Y1 direction toward drum separator 108 and check valve 110. Impingement plate 106 can be disposed within liquid knockout drum 104 by any suitable means including any one of or any combination of, for example, welds, bolts, fasteners, screws, removable inserts, and suspension means. Without being bound by any theory or explanation, by using a metallic plate, which obstructs the feedstream comprising a liquid fluid, a sudden change in pressure occurs when the stream contacts the plate, and liquid is knocked out or separated from the gas.

Figure 2:
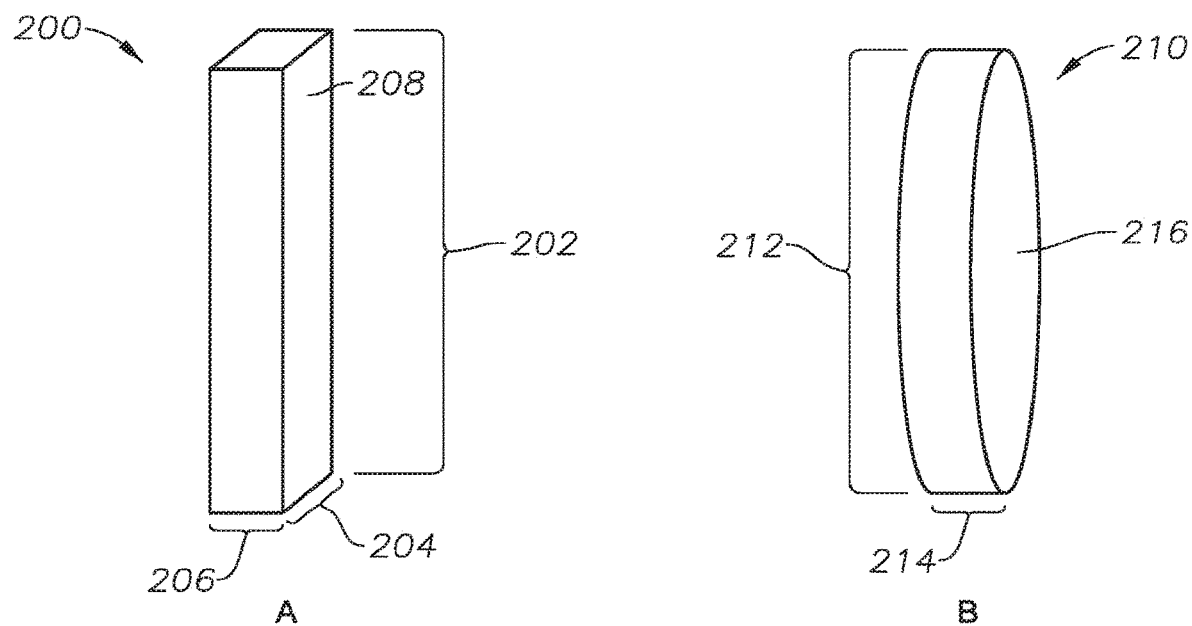
FIG. 2 provides perspective views of example impingement plates for use in embodiments of the present disclosure.

Referring to FIGS. 2A and 2B, certain example shapes are shown for impingement plates. Plate 200 is a substantially rectangular prism and has a length 202, a width 204, and thickness 206. For use of plate 200 in the embodiment of FIG. 1, the length 202 and width 204 are both about 16 centimeters (cm) (6.30 inches (in)), such that a forward face 208 of plate 200 completely spans the inner diameter of feedstream 102 and inlet cavity 117, which is about 15 cm (about 5.761 in), discussed further as follows. The thickness 206 of the plate 200 is about 1.27 cm (0.5 in) for use in the embodiment of FIG. 1. In other embodiments, the length, width, and thickness of an impingement plate can be adjusted and suitably fitted to a system responsive to any one of or any combination of the inner diameter of the feedstream, the pressure and temperature of the feedstream, the size, shape, and arrangement of the liquid knockout drum, the pressure and temperature of the liquid knockout drum, and the liquid content characteristics of the natural gas.

Plate 210 is a substantially cylindrical disc and has a diameter 212 and thickness 214. For use of plate 210 in the embodiment of FIG. 1, the diameter 212 is about 16 cm (6.30 in), such that a forward face 216 of plate 210 completely spans the inner diameter of feedstream 102, which is about 15 cm (about 5.761 in), discussed further as follows. The thickness 214 of the plate 210 is about 1.27 cm (0.5 in) for use in the embodiment of FIG. 1. In other embodiments, the diameter and thickness of an impingement plate can be adjusted and suitably fitted to a system responsive to any one of or any combination of the inner diameter of the feedstream, the pressure and temperature of the feedstream, the size, shape, and arrangement of the liquid knockout drum, the pressure and temperature of the liquid knockout drum, and the liquid content characteristics of the natural gas.

Referring again to FIG. 1, the impingement plate 106 is spaced at a distance S from the inlet cavity 117 of the feedstream 102. In the embodiment of FIG. 1, impingement plate 106 is disposed about 0.5 m (about 1.6 ft) away from the inlet cavity 117. In certain embodiments, one or more impingement plates are permanently disposed, such as, for example, by welding, within a liquid knockout drum; however, in other embodiments one or more impingement plates in a liquid knockout drum are interchangeable and removable, such as being slidable in channels and grooves within a liquid knockout drum. In the embodiment of FIG. 1, the impingement plate 106 is made substantially from steel, but in other embodiments any suitable material or combination of materials to cause liquid to aggregate on the impingement plate from the wet gas stream can be used.

In some embodiments any one of or any combination of the size, shape, amount, disposition, material composition, permanence, temperature, or interchangeability of one or more impingement plates within a liquid knockout drum are responsive to any one of or any combination of the inner diameter of the feedstream, the pressure and temperature of the feedstream, the size, shape, and arrangement of the liquid knockout drum, the pressure and temperature of the liquid knockout drum, and the liquid content characteristics of the natural gas.

In some embodiments, all or portions of an impingement plate are solid or hollow. In some embodiments, the forward face of an impingement plate facing the inlet cavity of the wet gas feedstream is substantially solid and flat; however, in other embodiments the forward face of an impingement plate facing a wet gas feedstream can have holes, cavities, or pores, optionally to increase surface area for liquid aggregation and dropout into the liquid knockout drum. In some embodiments, an impingement plate can have through-channels for potential condensates and liquid dropout to travel by gravity downwardly to a check valve substantially through the impingement plate. In some embodiments, the temperature of the impingement plate is controlled either by heating or cooling to increase the amount of liquid knocked out of the gas stream.

In the embodiment shown in FIG. 1, there is one impingement plate 106. However, in other embodiments, more or fewer impingement plates could be placed within a liquid knockout drum. More or fewer liquid knockout drums could be placed in any arrangement and position to optimize liquid fluid removal from the wet gas. For instance, a series of impingement plates can be placed throughout a liquid knockout drum to optimize liquid and potential condensate collection near a check valve for the fluid to be drained before a venturi meter. In other embodiments, the liquid knockout drum can collect liquid fluids, with one or more impingement plates placed in a gas inlet or gas outlet line, and not within the liquid knockout drum itself.

Water and other liquids that aggregate on impingement plate 106 or otherwise drop out of the wet gas in liquid knockout drum 104 fall by way of gravity in the Y1 direction toward drum separator 108. As shown, drum separator 108 slants downwardly in the Y1 direction from the side wall 116 toward the check valve 110. The drum separator 108 is a thin, water-proof steel sheet in the embodiment of FIG. 1. Drum separator 108 separates an upper portion 107 of liquid knockout drum 104 from a lower portion 109, and liquid fluid flows from the upper portion 107 to the lower portion 109 by way of check valve 110 when check valve 110 is in an open state. In other embodiments, a drum separator can be any thin layer that fluidly separates an upper portion of a liquid knockout drum from a lower portion of the liquid knockout drum.

Check valve 110 allows for the one-way flow of liquid fluid downwardly in the Y1 direction from the liquid knockout drum 104 to the liquid outlet line 112. Fluid, such as gas and liquid, will not flow upwardly in the Y2 direction through the check valve 110. In the embodiment of FIG. 1, the check valve 110 opens responsive to the liquid level accumulated above the check valve 110. Check valve 110 opens when liquid accumulated above check valve 110 reaches level L1, and the check valve 110 closes when the liquid is reduced to level L2 by flowing through check valve 110 to lower portion 109.

The liquid levels L1 and L2 can be detected or measured by any means known in the art for detecting liquid levels including sonar, for example. In addition, check valve 110 can be calibrated to open when a certain mass of liquid rests above check valve 110, and can similarly be calibrated to close when a lesser mass of liquid rests above check valve 110. When the check valve 110 is open, fluid flows downwardly by gravity in the Y1 direction toward liquid outlet line 112 and is forced through liquid outlet line 112 by the pressure from liquid knockout drum pressure line 122 when liquid knockout valve 128 is open, discussed further as follows. Liquid knockout valve 128 and liquid outlet valve 130 are optional and neither is required, as gas can be allowed to passively flow though liquid knockout drum pressure line 122 and liquid outlet line 112 at all times.

In some embodiments, a check valve is set to open when a predetermined amount of liquid fluid is accumulated at the check valve in a liquid knockout drum. In other embodiments, the check valve is set to open at predetermined time intervals when a gas feedstream is flowing. In other embodiments, a user determines when to open the check valve based on the amount of liquid fluid collected at the check valve, and a user can do so through any one of or any combination of a remote connection, a wireless connection, and a wired connection. In some embodiments, the pressure above a check valve in the Y2 direction is substantially the same as the pressure below the check valve in the Y1 direction. In other embodiments, the pressure above a check valve in the Y2 direction is substantially different than the pressure below the check valve in the Y1 direction. In some embodiments, the pressure differential between a portion of a liquid knockout drum above a check valve and a portion of a liquid knockout drum below a check valve is about ±15 psig.

Dry gas outlet line 114 proceeds to and is in fluid communication with venturi meter 118. Any commercially-available venturi meter is envisioned for use in the systems and methods of the present disclosure. For example, venturi meters sold by ABB Ltd., headquartered in Zurich, Switzerland, are envisioned for use with the systems and methods of the present disclosure. One such meter has an inner pipe diameter of about 103.7 millimeters (mm) and a constricted throat diameter of about 73.2 mm.

As a fluid, such as natural gas, flows from dry gas outlet line 114 with diameter D1 through venturi meter 118 with a constricted diameter D2, the fluid's velocity must increase, and the static pressure decreases. By measuring the change in pressure, the flow rate of a fluid can be determined. Dry gas outlet line 114 comprises dry gas from which water, and other liquids, have been removed. This increases the accuracy of measurement of venturi meter 118, as only one fluid phase (gas) is passing through the meter rather than two fluid phases (gas and liquid). Importantly, embodiments of the present disclosure contemplate applying systems and methods to existing venturi meters in existing gas pipelines, and additional meters, such as gas turbine flow meters and water cut meters, are not required.

In addition to single-phase fluid flow meters that use a constricted diameter to measure fluid flow by a change in differential pressure of the flowing fluid, such as venturi meters, the systems and methods of the present disclosure are contemplated to increase the accuracy of any flow measurement device that is primarily designed for single-phase flow measurement by removing liquid from a gas stream, provided that the device is in the proximity of a pressure choke valve (pressure chock) to provide higher pressure for re-introducing the separated fluid downstream of the pressure choke valve.

Post-venturi pipe segment 120, in which dry gas expands after passing through venturi meter 118, provides pressure to liquid knockout drum pressure line 122. Liquid knockout drum pressure line 122 pressurizes liquids in the liquid knockout drum 104, which have passed through check valve 110. The pressure from liquid knockout drum pressure line 122 drives liquids through the liquid outlet line 112 to the manifold line 124. Dry gas from post-venturi pipe segment 120 is recombined with liquid fluid in manifold line 124 after passing through pressure choke 126. In this way, the venturi meter 118 measures only dry gas, but there is no additional line needed to carry away liquid fluids, as they are recombined in the manifold line 124.

Pressure choke 126, liquid knockout valve 128, and liquid outlet valve 130 control and regulate the gas flow in system 100. Any one of or any combination of pressure choke 126, liquid knockout valve 128, and liquid outlet valve 130 can be manually controlled (opened and closed) by a user or operator and can be automated and controlled by a distributed control system (DCS) (not shown) used in natural gas pipeline systems. For example, in system 100, if liquid fluid were flowing through check valve 110 (in other words check valve 110 were open), then liquid knockout valve 128 can either be manually opened by a user or automatically set to open, responsive to opening of check valve 110, to allow gas flow from liquid knockout drum pressure line 122 to drive the liquid through liquid outlet line 112. In this case, liquid outlet valve 130 would also need to be open to allow the liquid and gas to flow to the manifold line 124.

Depending on the gas flow needed from liquid knockout drum pressure line 122 to drive the liquid through liquid outlet line 112, pressure choke 126 and liquid knockout valve 128 could be partially or fully open (either manually or automatically responsive to the amount of liquid that needs to be driven out of the liquid knockout drum 104 through liquid outlet line 112) to increase the gas flow in liquid knockout drum pressure line 122.

As noted previously, the pressure in the liquid knockout drum 104 is about 950 psig and the temperature is about 180° F., in some embodiments. The pressure downstream of the pressure choke 126, for example in the manifold line 124, is about 59 atm to about 62 atm (about 850 psig to about 900 psig), and the temperature is in the range of about 66° C. to about 71° C. (about 150° F. to about 160° F.). For example, in some embodiments of operation of system 100, a pressure P1 at feedstream 102 minus a pressure P2 at the dry gas outlet line 114 is greater than a pressure P4 in lower portion 109 of liquid knockout drum 104; a pressure P3 at post-venturi pipe segment 120 is greater than pressure P4 in lower portion 109 of liquid knockout drum 104; and pressure P4 in lower portion 109 of liquid knockout drum 104 is greater than a pressure P5 in manifold line 124. In some embodiments, differential pressure across a pre-existing gas pipeline pressure choke, such as for example pressure choke 126, allows the efficient operation of systems and methods of the present disclosure.

In the system 100, if the check valve 110 were closed, the system could be programmed to automatically close liquid knockout valve 128 and liquid outlet valve 130 such that gas flow proceeded only through pressure choke 126 to the manifold line 124. In some embodiments, system 100 can include one or more optional liquid flow meters 132 on liquid outlet line 112.

In the embodiment of FIG. 1, the outer diameter of the feedstream 102, the dry gas outlet line 114, and the manifold line 124 is about 17 cm (about 6.625 in) and the inner diameter, D1, of the feedstream 102, the dry gas outlet line 114, and the manifold line 124 is about 15 cm (about 5.761 in). In the embodiment shown, feedstream 102, dry gas outlet line 114, and manifold line 124 are made substantially from steel. In other embodiments, other size pipes made from any other pipe material known in the art, such as plastic, can be used with the systems and methods of the present disclosure.

Still referring to FIG. 1, the outer diameter of the liquid knockout drum pressure line 122 and the liquid outlet line 112 is about 9 cm (about 3.5 in) and the inner diameter of the liquid knockout drum pressure line 122 and the liquid outlet line 112 is about 7 cm (about 2.624 in). In the embodiment shown, liquid knockout drum pressure line 122 and the liquid outlet line 112 are made substantially from steel. In other embodiments, other size pipes made from any other pipe material known in the art, such as plastic, can be used with the systems and methods of the present disclosure.

The venturi meter 118 is located upstream, or ahead of, the pressure choke 126. Using the pressure choke 126, line pressure in post-venturi pipe segment 120 can be maintained to be greater than the line pressure in manifold line 124. This pressure differential helps to pressurize the separated liquids in lower portion 109 of liquid knockout drum 104 to reintroduce them into the lower pressure portion downstream of the pressure choke 126 into manifold line 124. The differential pressure across pressure choke 126 can be different for each well and can range from about 10 psig to about 1,000 psig. Valves 128 and 130 help further to fine tune the pressures within the system.

Figure 3:
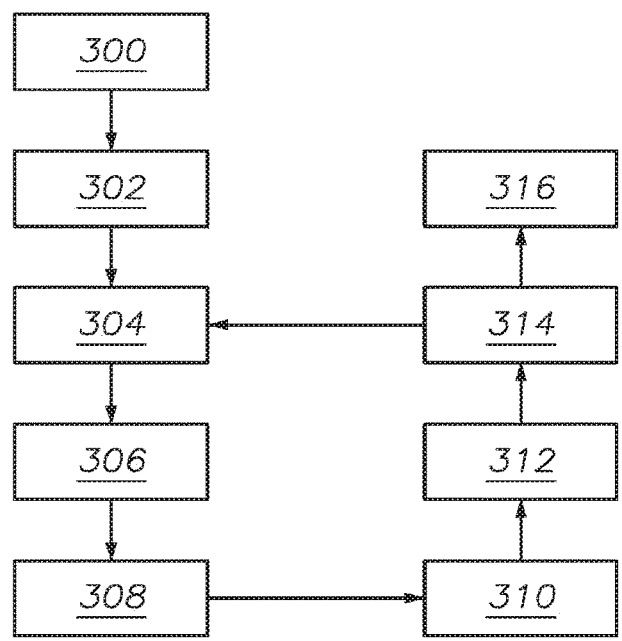
FIG. 3 provides a flow chart for one exemplary method of liquid knockout for a wet gas well.

Referring now to FIG. 3, a flow chart is provided for one exemplary method of liquid knockout for a wet gas well using the embodiment of the system shown in FIG. 1 and described previously. Any of the steps described can be carried out by a user or operator, or can be automated and carried out by an automated distributed control system using any one of or any combination of wired and wireless connections to components. First, at step 300, feedstream 102 comprising wet gas is activated to flow in a natural gas pipeline system toward the liquid knockout system 100 comprising the liquid knockout drum 104 and the impingement plate 106. The liquid knockout drum 104 includes at least one impingement plate 106 for removal of water and other liquid fluids from the wet gas feedstream 102.

At step 302, pressure choke 126 is open, and liquid knockout valve 128 and liquid outlet valve 130 are closed. In this step, all of the dry gas flows to the manifold line 124 by way of the post-venturi pipe segment 120, as liquids fall out of the wet gas in liquid knockout drum 104 and accumulate on drum separator 108 around check valve 110. At step 304, liquid fluids in the liquid knockout drum 104 have reached level L1, and the check valve 110 is opened to allow liquid to flow to liquid outlet line 112, until the liquid level in liquid knockout drum 104 has reached level L2. At step 306, liquid knockout valve 128 and liquid outlet valve 130 are opened such that gas in liquid knockout drum pressure line 122 drives the liquid through liquid outlet line 112 to manifold line 124.

At step 308, the pressure choke 126 is partially constricted to redirect more gas through liquid knockout drum pressure line 122. At step 310, when the liquid level returns to level L2 from level L1, the check valve 110 is closed. At step 312, the pressure choke 126 is fully unconstricted. At step 314, the liquid knockout valve 128 and liquid outlet valve 130 are closed. After step 314, the process described from step 304 to step 314 will continue, until the system 100 is deactivated at step 316, for instance when the feedstream 102 is deactivated.

In the various embodiments of the disclosure described, a person having ordinary skill in the art will recognize that various types of memory are readable by a computer, such as the memory described in reference to the various computers and servers, e.g., computer, computer server, web server, or other computers with embodiments of the present disclosure.

The singular forms "a," "an," and "the" include plural referents, unless the context clearly dictates otherwise.

In the drawings and specification, there have been disclosed embodiments of systems and methods for accurate measurement of gas from wet gas wells of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

That claimed is:

1. A method for liquid removal to increase accuracy of gas flow meters, the method comprising the steps of:
    contacting a natural gas feedstream comprising wet gas with an impingement plate;
    separating liquids from the natural gas feedstream to produce a dry gas stream and aggregated liquids;
    collecting the aggregated liquids from the natural gas feedstream;
    measuring a flow rate of the dry gas stream, including the use of a venturi meter;
    pressurizing the collected aggregated liquids with a portion of the dry gas stream after measuring the dry gas stream, the portion of the dry gas stream expanding after measuring, where a first pressure of the portion of the dry gas stream after measuring is greater than a second pressure surrounding the collected aggregate liquids; and
    flowing the collected aggregated liquids and the portion of the dry gas stream to a common line.

2. The method of claim 1, further comprising the step of recombining the aggregated liquids and the portion of the dry gas stream with a remaining portion of the dry gas stream, where the remaining portion of the dry gas stream is not used to pressurize the aggregated liquids.

3. The method of claim 2, where the step of separating liquids from the natural gas feedstream further comprises the step of utilizing a liquid knockout drum, the liquid knockout drum operable to receive the natural gas feedstream comprising wet gas.

4. The method of claim 3, where the step of collecting the aggregated liquids from the natural gas feedstream further comprises the step of accumulating the aggregated liquids at a drum separator, where the drum separator separates a first portion of the liquid knockout drum from a second portion of the liquid knockout drum.

5. The method of claim 4, where the step of collecting the aggregated liquids from the natural gas feedstream further comprises the step of actuating a check valve, where the check valve is disposed between the first portion of the liquid knockout drum and the second portion of the liquid knockout drum proximate the drum separator, and where the check valve is operable to allow one way liquid fluid communication from the first portion of the liquid knockout drum to the second portion of the liquid knockout drum when the check valve is an in open state.

6. The method of claim 4, where the step of pressurizing the aggregated liquids further comprises the step of opening a valve disposed between a gas flow meter and the second portion of the liquid knockout drum.

7. The method of claim 2, where the step of recombining the aggregated liquids and the portion of the dry gas stream with the remaining portion of the dry gas stream further comprises the step of opening a valve between the second portion of the liquid knockout drum and the common line.

8. The method of claim 1, further comprising the step of disposing the impingement plate between about 0.1 m and 1 m away from the natural gas feedstream comprising wet gas, with a forward face disposed facing toward the a natural gas feedstream, where the forward face is larger than an inlet cavity of the natural gas feedstream comprising wet gas.

9. The method of claim 5, where the step of actuating a check valve check further comprises maintaining the check valve in a closed position as aggregated liquids collect around the drum separator, and opening the check valve responsive to a predetermined level of aggregated liquids collecting proximate the drum separator.

10. The method of claim 1, where the step of measuring the flow rate of the dry gas stream further comprises flowing the dry gas stream through a portion of pipe with a reduced diameter.

* * * * *